(12) United States Patent
Bird et al.

(10) Patent No.: US 8,534,045 B2
(45) Date of Patent: Sep. 17, 2013

(54) AFTER-TREATMENT DE-CONTAMINATION SYSTEM

(75) Inventors: Stephen W. Bird, Peterborough (GB);
Paul J. Quinney, Peterborough (GB);
Sanjay K. Rajani, Peterborough (GB);
James J. Reed, Yaxley (GB); Anil Raina, Peoria, IL (US)

(73) Assignee: Perkins Engines Company Limited, Peterborough (GB)

( * ) Notice: Subject to any disclaimer, the term of this patent is extended or adjusted under 35 U.S.C. 154(b) by 934 days.

(21) Appl. No.: 12/501,625

(22) Filed: Jul. 13, 2009

(65) Prior Publication Data

US 2010/0005784 A1    Jan. 14, 2010

(30) Foreign Application Priority Data

Jul. 11, 2008   (EP) .................................... 08160273

(51) Int. Cl.
*F01N 3/00* (2006.01)
*F01N 3/02* (2006.01)
*F01N 1/00* (2006.01)

(52) U.S. Cl.
USPC ............. 60/277; 630/274; 630/285; 630/295; 630/297; 630/311; 630/324

(58) Field of Classification Search
USPC ................... 60/274, 276, 295, 297, 311, 324, 60/277
See application file for complete search history.

(56) References Cited

U.S. PATENT DOCUMENTS

| | | | |
|---|---|---|---|
| 6,862,881 B1 | 3/2005 | Klingbeil et al. | |
| 7,157,919 B1* | 1/2007 | Walton | 324/641 |
| 7,337,608 B2* | 3/2008 | Gabe et al. | 60/286 |
| 7,469,531 B2* | 12/2008 | Viola | 60/286 |
| 7,484,357 B2* | 2/2009 | Dollmeyer et al. | 60/274 |
| 7,591,132 B2* | 9/2009 | Viola | 60/286 |
| 7,707,826 B2* | 5/2010 | Wang et al. | 60/295 |
| 2001/0052232 A1 | 12/2001 | Hoffmann et al. | |
| 2004/0035101 A1 | 2/2004 | Imai et al. | |

FOREIGN PATENT DOCUMENTS

| | | |
|---|---|---|
| EP | 1146216 | 10/2001 |
| EP | 1234959 | 8/2002 |
| EP | 1541829 A1 | 6/2005 |
| EP | 1591638 A1 | 11/2005 |
| EP | 1669565 * | 6/2006 |
| FR | 2899644 | 10/2007 |

* cited by examiner

*Primary Examiner* — Thomas Denion
*Assistant Examiner* — Diem Tran
(74) *Attorney, Agent, or Firm* — Finnegan, Henderson, Farabow, Garrett & Dunner LLP

(57) ABSTRACT

In one aspect an internal combustion engine assembly may be provided that may include at least one combustion chamber and an exhaust system with an after-treatment system that may have an oxidation catalyst and a particulate filter. The internal combustion engine assembly may include an electronic controller that may have a de-contamination function that may, responsive to a command be configured to de-contaminate the particulate filter and the oxidation catalyst. To that end, a method may be provided to, and the controller may be configured to increase the exhaust gas temperature at an inlet of the after-treatment system to above a de-contamination temperature during a certain time period.

29 Claims, 2 Drawing Sheets

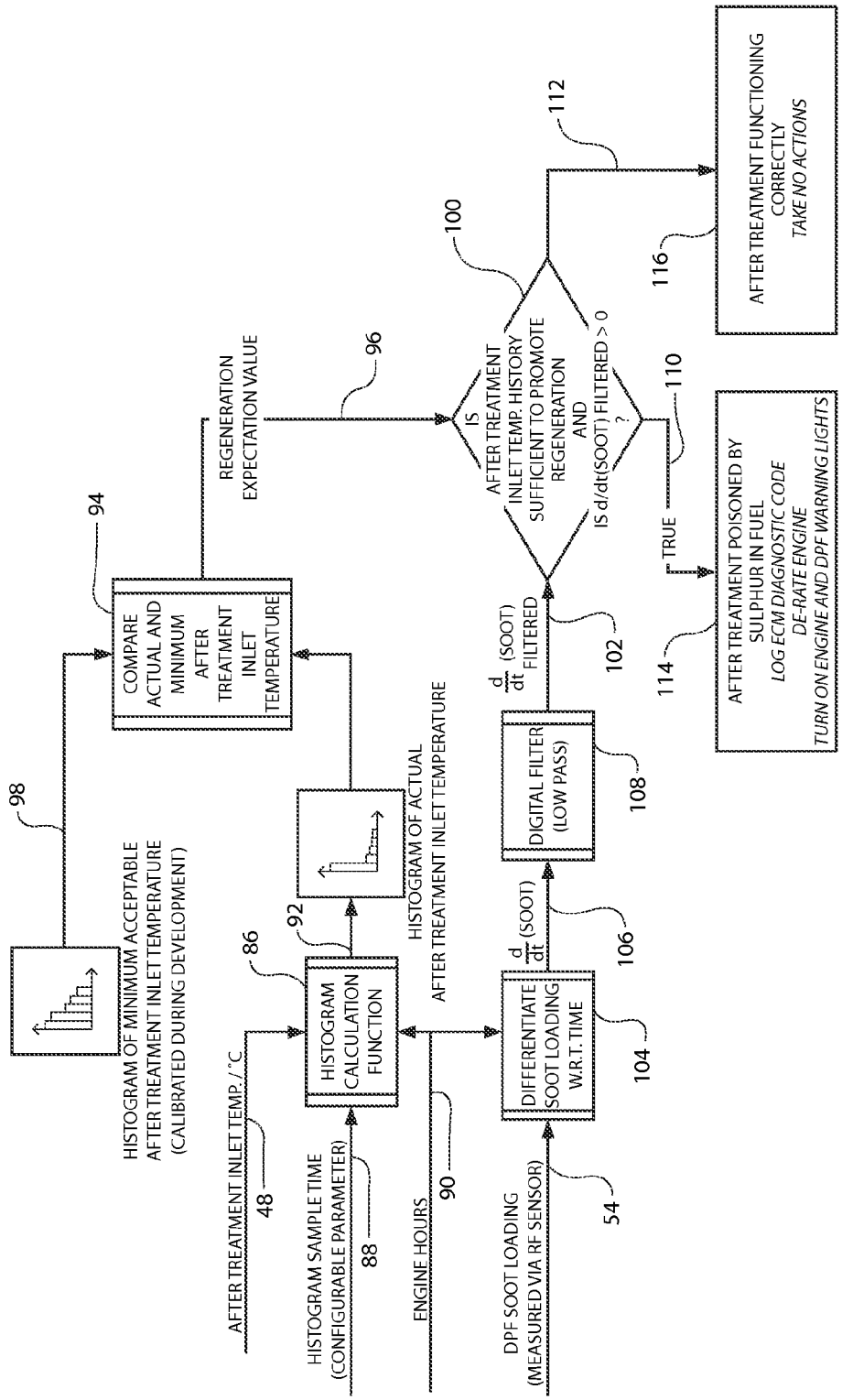

AFTER-TREATMENT DE-CONTAMINATION SYSTEM

TECHNICAL FIELD

The disclosure relates to an after-treatment de-contamination system, more particularly to an after-treatment de-contamination system for an after-treatment system having a diesel particulate filter and an oxidation catalyst.

BACKGROUND

Engines, including diesel engines, gasoline engines, natural gas engines, and other engines known in the art, may exhaust a complex mixture of air pollutants. The air pollutants may be composed of both gaseous and solid material, such as, for example, particulate matter. Particulate matter may include ash and unburned carbon particles and may sometimes be referred to as soot.

Due to increased environmental concerns, exhaust emission standards have become more stringent. The amount of particulate matter and gaseous pollutants emitted from an engine may be regulated depending on the type, size, and/or class of engine. In order to meet these emissions standards, engine manufacturers have pursued improvements in several different engine technologies, such as fuel injection, engine management, and air induction, to name a few. In addition, engine manufacturers have developed exhaust after-treatment systems to treat the exhaust gas after it leaves the engine.

Engine manufacturers have employed exhaust after-treatment devices called particulate filters or particulate traps to remove the particulate matter from the exhaust flow of an engine. A particulate trap may include a filter designed to trap particulate matter. The use of the particulate filter for extended periods of time, however, may enable particulate matter to accumulate on the filter, thereby causing damage to the filter and/or a decline in engine performance.

The particulate traps may be combined with oxidation catalysts to decrease the temperatures at which oxidation of NO takes place and to promote formation of CO2 out of the particulate matter. Such oxidation catalysts and particulate filters may be contaminated, for example, when the wrong fuel is supplied to the engine. For example, in a diesel engine assembly the diesel oxidation catalyst may be contaminated when a diesel fuel containing a significant amount of sulfur is used. Contamination should not be confused with a high soot load level. A high soot load level may normally be solved by regeneration of the after-treatment system that may be done at relatively low temperatures. Contamination is a situation in which the oxidation catalyst may have become inoperative or less effective so that the regeneration at the relatively low temperatures may not be effected anymore. It is a challenge to de-contaminate a contaminated after-treatment system.

The present disclosure is directed, at least in part, to improving or overcoming some aspects of known after-treatment systems.

SUMMARY OF THE INVENTION

In one aspect an internal combustion engine assembly may be provided that may include at least one combustion chamber and an exhaust system with an after-treatment system that may have an oxidation catalyst and a particulate filter. The internal combustion engine assembly may include an electronic controller that may have a de-contamination function that may, responsive to a command, be configured to de-contaminate the particulate filter and the oxidation catalyst by increasing the exhaust gas temperature at an inlet of the after-treatment system to above a de-contamination temperature during a certain time period.

In another aspect a method for de-contaminating an after-treatment assembly of an exhaust system of an internal combustion engine assembly having at least one combustion chamber, the after-treatment assembly having a particulate filter and an oxidation catalyst may be provided. The method may increase the exhaust gas temperature at an inlet of the after-treatment system to above a de-contamination temperature during a certain time period.

BRIEF DESCRIPTION OF THE DRAWINGS

FIG. 2 is a diagram showing an embodiment of a contamination detection system.

DETAILED DESCRIPTION

Figure 1:
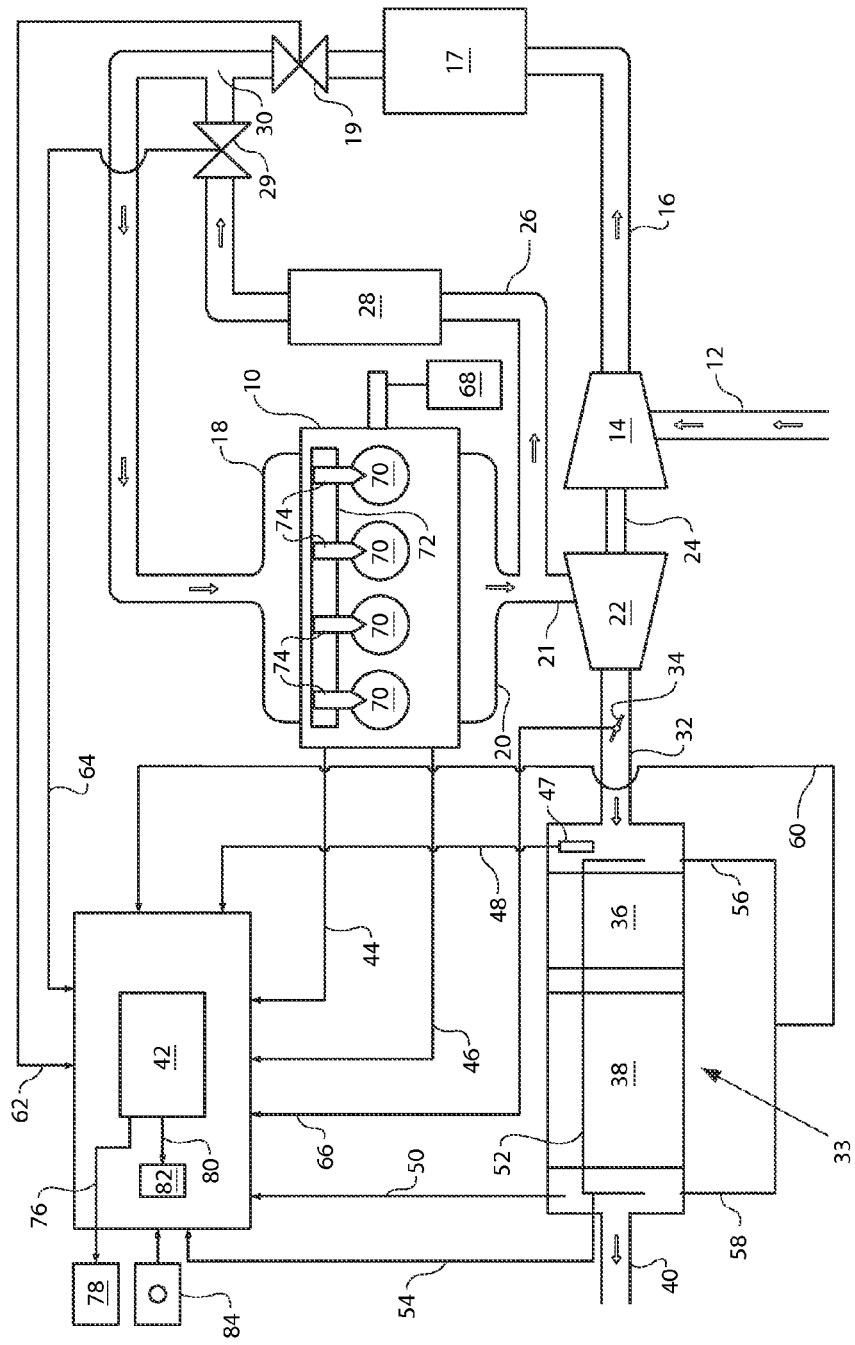
FIG. 1 is a schematic overview of a internal combustion engine assembly with an exhaust gas after-treatment system.

In one aspect, the disclosure relates to an internal combustion engine assembly for driving a load. A schematic overview of an embodiment of an internal combustion engine assembly is shown in FIG. 1. The internal combustion engine assembly may include an internal combustion engine 10, an air intake system and an exhaust system. The internal combustion engine may have combustion chambers 70 and associated pistons. Each combustion chamber 70 may have an associated fuel injector 74 for injecting fuel in the combustion chamber. The at least one fuel injector 74 may be included in a fuel supply system 72 that may also include a fuel pump, a fuel tank and fuel lines. Each combustion chamber may also have at least one air intake port with an associated intake port valve and at least one exhaust port with an associated exhaust port valve. Engine 10 may be any kind of engine that produces a flow of exhaust gases. For example, engine 10 may be an internal combustion engine, such as a gasoline engine, a diesel engine, a gaseous fuel burning engine or any other exhaust gas producing engine. Instead of fuel injectors 74 also other means may be present for supplying fuel to the combustion chambers 70. For example, fuel may be introduced into the intake air upstream from the at least one intake port of the at least one combustion chamber 70.

The air intake system may include an air intake passage 12 that may be connected to a compressor 14. An outlet of the compressor 14 may be connected via air intake passage 16 to an intake manifold 18 of the internal combustion engine 10. The air intake passage 16 may include an after cooler 17. Other components may also form part of the air intake system. An example may be a intake throttle valve 19 for regulating the amount of intake air that may be supplied to the internal combustion engine 10.

The exhaust system may include an exhaust manifold 20 that may be connected via a exhaust passage 21 to a turbine 22. The turbine 22 may have a shaft 24 that may be connected to the compressor 14 for driving the compressor 14. An exhaust gas recirculation passage 26 may have an inlet that may be connected to the exhaust manifold 22 or to the exhaust passage 21 connecting the exhaust manifold 20 to the turbine 22. An outlet 30 of the exhaust gas recirculation passage 26 may be in fluid communication with the inlet system. The exhaust gas recirculation passage 26 may include an EGR-cooler 28. The EGR-passage 26 may also include a non-return valve assembly that may prevent that intake air flows to the exhaust system. The EGR-passage 26 may also include an EGR-valve 29 for controlling the amount of exhaust gas that is introduced into the air intake system.

An exhaust outlet of the turbine 22 may be connected to an exhaust passage 32. The exhaust system may also include backpressure valve 34 downstream of the turbine. The exhaust passage 32 may emanate in an after-treatment assembly 33. The after-treatment assembly 33 may include an oxidation catalyst 36 and a particulate filter 38. In the oxidation catalyst 36 NO may be converted into NO2 as exhaust gas passes over the oxidation catalyst 36. In the particulate filter the NO2 is brought into contact with C, a main constituent of particulate matter or soot, leading to conversion of these substances into CO2+NO. Thus, particulate matter or soot may be regenerated at lower temperatures than without an oxidation catalyst 36. In one embodiment of a system with an oxidation catalyst 36 regeneration may occur at any temperature above approximately 260° C.

The particulate filter 38 may be configured to remove one or more types of particulate matter from the exhaust gases produced by engine 10. Particulate filter 38 may include an outer housing, which may encase a filter medium (e.g. a metal mesh or screen, or a porous ceramic material, such as cordierite) configured to remove (i.e., trap) one or more types of particulate matter from the exhaust flow of engine 10. The after-treatment assembly 33 may include multifunctional devices such as a combination of a oxidation catalyst 36 and a particulate filter 38 in the same unit or a catalytic particulate filter, wherein filter medium may include a catalytic material and/or a catalytic coating.

A downstream end of the after-treatment assembly 33 may be connected to an exhaust passage 40 that may emanate into the environment. The exhaust passage 40 may include further components including a muffler.

An electronic controller 42 may be present. The electronic controller may have a memory 43. Such an electronic controller 42 may be connected to signal lines that may transmit information received from sensors that are present in the system. The embodiment of FIG. 1 shows a number of signal lines including signal line 44 that may transmit a speed signal that is indicative of engine speed. Signal line 46 may transmit a load signal that is indicative of the load driven by the engine 10. An exhaust gas temperature sensor 47 that may be adjacent the entrance of the after-treatment system 33 may be connected to a signal line 48 that may transmit an entrance temperature signal that is indicative of the temperature on the upstream side of the oxidation catalyst 36. Signal line 50 may transmit an exit temperature signal that is indicative of the temperature on the downstream side of the particulate filter 38. An actual soot loading level sensor assembly 52 may be present that may provide a signal that includes information related to an actual soot loading level related parameter. In one embodiment that actual soot loading level sensor assembly 52 may include a soot loading sensor 52 in the particulate filter 38. The soot loading sensor 52 may in an embodiment be a RF-sensor 52 (radio frequency sensor) in the particulate filter 38 that directly measures a soot loading level in the particulate filter. Signal line 54 may transmit soot loading signals from the soot loading sensor 52 that may be indicative of the soot loading in the particulate filter 38. Signal line 56 may transmit an entrance pressure that may be obtained by a pressure sensor and that may be indicative of the pressure at the upstream side of the oxidation catalyst 36. Signal line 58 may transmit an exit pressure that may be obtained by a pressure sensor and that may be indicative of the pressure at the downstream side of the particulate filter 38. Signal line 60 may transmit a pressure difference signal that may be obtained by a pressure difference sensor and that may be indicative of the pressure difference between the upstream side and the downstream side of the after-treatment system. The pressure sensors or the pressure difference sensor may also have the function of the actual soot loading level sensor assembly providing a signal that includes information related to an actual soot loading level related parameter. Signal line 62 may transmit an intake throttle valve signal that may be indicative of the position of the intake throttle valve. Signal line 64 may transmit a EGR-valve signal that may be indicative of the position of the EGR-valve. Signal line 66 may transmit a backpressure valve signal that is indicative of the position of the backpressure valve 34. The signal lines may be real signal lines that transmit electric, hydraulic or pneumatic signals. The signal lines may also be wireless signal lines.

The electronic controller 42 may also transmit control signals to the various components of the internal combustion engine assembly. Signals that may be transmitted may, for example, include signals for controlling fuel injectors for injecting fuel in the combustion chambers 70, signals for controlling the position of the intake throttle valve 19, signals for controlling the position of the EGR-valve 29, signals for controlling the position of the backpressure valve 34, and/or signals for opening or closing inlet port valves and outlet port valves from combustion chambers 70 of the internal combustion engine.

In an embodiment that may include a turbocharger having a turbine 22 that is included in the exhaust system, the back pressure valve 34 may be downstream of the turbine 22 and upstream of the oxidation catalyst 36 and the particulate filter 38. In an alternative embodiment, the backpressure valve 34 may be downstream of the after-treatment assembly 33.

The internal combustion engine assembly may have an electronic controller 42 that may have a de-contamination function. The de-contamination function may be activated responsive to a command. The command may, for example, be provided by the user by activating a de-contamination button 84 or the command may be generated automatically by the engine controller if a contamination condition is detected. The decontamination button 84 may be provided in an operating area of the user. The de-contamination function may be configured to de-contaminate the particulate filter 38 and the oxidation catalyst 36 by increasing the exhaust gas temperature at an inlet of the after-treatment system 33 to above a de-contamination temperature during a certain time period. The de-contamination temperature may be approximately 400° C. The certain time period may, for example be longer than approximately 6 minutes and, for example, be shorter than approximately 20 minutes.

In an embodiment, for increasing the exhaust gas temperature at the inlet of the after-treatment system 33 to above the de-contamination temperature, the de-contamination function of electronic controller 42 may be configured to control a position of back pressure valve 34. The position of the backpressure valve 34 may be used very effectively to increase the exhaust gas temperature. In a more closed position of the backpressure valve 34, the exhaust gas temperature will be higher than in a more open position. The electronic controller 42 may also be configured to control at least one of the following parameters for increasing the exhaust gas temperature at the inlet of the after-treatment system 33 to above the de-contamination temperature: a load of the engine 10, a speed of the engine 10, a position of the intake throttle valve 19, an intake pressure, and a fuel supply to the at least one combustion chamber 70 including, for example, an amount of fuel supplied to the at least one combustion chamber 70 and/or a fuel injection timing.

The electronic controller 42 may be configured to increase the load of the engine 10 by using auxiliary equipment 68. Auxiliary equipment 68 that may be controlled by the controller 42 for increasing the load may be one or more equipment chosen from a group including: a cooling water pump, an air conditioner, a hydraulic pump, an electric generator, a fan, a heating system, a compressor, and lights. Of course, other auxiliary equipment may be used also for increasing the load of the engine 10 in order to obtain de-contamination of the after-treatment system 33.

A waste gate valve may be present that may bypass exhaust gas along the turbine 22. To increase the intake pressure the electronic controller 42 may be configured to close the waste gate valve. In one embodiment the controller 42 may be configured for controlling at least one of the intake throttle valve 19 and the fuel supply system 72 so that an air/fuel-ratio in the at least one combustion chamber 70 is such that the temperature of exhaust gas is above a limit temperature that is so high that de-contamination of the after-treatment system 33 takes place. The air/fuel-ratio may be influenced by controlling the intake throttle valve 19 and/or by controlling the fuel supply system 72. The fuel supply system 72 may include at least one fuel injector 74 for injecting fuel in an associated one of the at least one combustion chamber 70. The controller 42 may be configured for controlling the amount of fuel and the fuel injection timing of the at least one fuel injector 74 so that the temperature of exhaust gas is above a de-contamination limit temperature. The de-contamination limit temperature may be 400° C. An air/fuel mixture that contains relatively much fuel, i.e. a rich air/fuel mixture, may increase exhaust gas temperature. The exhaust gas temperature may also be increased by post injection, which involves injecting additional fuel into the combustion chambers after the combustion has taken place, which may result in the additional fuel being burned in the exhaust system, thereby elevating the temperature of the exhaust gases in the system.

In an embodiment, the controller 42 may be configured to provide an output signal that may be indicative that the command for activating the de-contamination function should be given. To that end, the internal combustion engine assembly may include a soot loading expectation assembly that may be configured to provide a signal that may include information related to an expected soot loading level related parameter. In an embodiment, the soot loading expectation assembly may be the temperature sensor 47. The temperature of the exhaust gas may be a good indication of whether regeneration of the particulate filter may be expected or not and thus indicate whether the soot loading level in the particulate filter 38 may be expected to increase or decrease. In another embodiment, the soot loading expectation assembly may use actual torque/speed-combinations of the engine to determine whether the soot loading level may be expected to increase or decrease. In yet another embodiment other signals may be used to determine whether the soot loading level may be expected to increase or decrease. Signals that may be used may, for example be provided by a torque sensor, an engine speed sensor, an intake throttle valve position sensor, an EGR-valve position sensor; a backpressure valve position sensor. Also signals produced by the electronic controller 42 may be used, including signals controlling the fuel supply system 72, the fuel injectors 74, the intake throttle valve 19, the EGR-valve 29 and the backpressure valve 34. In an embodiment, the soot loading expectation assembly may include a chemical composition sensor in the exhaust system that may be configured for measuring the presence and/or the concentration of at least one chemical component in the exhaust gas. For example, the concentration of NOx or CO2 in the exhaust gas may indicate that regeneration of the particulate filter may be expected or not. Combinations of these embodiments of soot loading expectation assemblies for providing a signal that includes information related to an expect soot loading level related parameter may also be feasible.

In an embodiment the electronic controller 42 may be configured to determine on the basis of a soot loading expectation assembly signal history, such as for example an exhaust gas temperature history, a value or signal indicative of an expected soot loading level related parameter in the particulate filter 38. The electronic controller 42 may also be configured to determine on the basis of the actual soot loading level sensor assembly signal 54 a value or signal indicative of an actual soot loading level related parameter in the particulate filter The electronic controller 42 may compare the expected soot loading level related parameter value or signal with the actual soot loading level related parameter value or signal and responsive to the comparing provide at least one output signal.

It is contemplated that the actual soot loading related parameter may be obtained directly. In that case, the actual soot loading level sensor assembly may be embodied as the soot loading sensor 52, for example a RF-sensor 52 that may be provided in the particulate filter 38. The electronic controller 42 may be configured for determining an actual soot loading related parameter from the soot loading sensor signal transmitted over signal line 54.

The actual soot loading related parameter may also be determined indirectly from an actual soot loading level sensor assembly. In that case, the actual soot loading level sensor assembly may be embodied as an assembly of pressure sensors. For example, on the basis of signals from pressure sensors that contain information about pressures of the exhaust gas. To that end an entrance pressure sensor may be provided that may provide a signal over signal line 56 that may be indicative of the pressure near the entrance of the after-treatment assembly 33. Also an exit pressure sensor may be provided that may provide a signal over signal line 58 that may be indicative of the pressure near the exit of the after-treatment assembly 33. Alternatively or additionally a pressure difference sensor may be provided that may provide a signal over signal line 60 that may be indicative of a pressure difference between the entrance and the exit pressure over the after-treatment assembly 33.

In one exemplary embodiment that has been diagrammatically represented in FIG. 2, the electronic controller 42 may include a soot loading expectation assembly signal history function 86, for example, an exhaust gas temperature history function 86. The soot loading expectation assembly signal history function 86 may be configured to store in the memory combinations of sample time moments and associated soot loading expectation assembly signals, for example exhaust gas temperatures, to determine the soot loading expectation assembly signal history. The soot loading expectation assembly signal history function 86 may have various input parameters including at least a sample time signal 88 and a soot loading expectation assembly signal 48 provided by the soot loading expectation assembly 47, for example an exhaust gas temperature signal 48 provided by the exhaust gas temperature sensor 47. The sample time signal 88 may for example be generated by the electronic controller 42. Another input parameter may be the time period 90 that the internal combustion engine assembly has been active. The output may be the stored combinations 92 of soot loading expectation assembly signals, for example exhaust gas temperatures, and sample time moments. It is contemplated that the output may be a value that may be derived from the combination 92 and that may be indicative the history of soot loading expectation assembly signals.

The electronic controller 42 may include a regeneration determination function 94. The regeneration determination function 94 may have as input parameters the combinations 92 of sample time moments and associated exhaust gas temperatures over a certain time period. The regeneration determination function 94 may include an algorithm configured to determine whether regeneration has been promoted and may be configured to output a regeneration expectation value 96. The regeneration expectation value 96 may be simple and just indicate whether regeneration has been promoted or not. The regeneration expectation value 96 may also be more complex and may give a value that is indicative of the amount of regeneration that has taken place or the amount of soot that may have been accumulated based on the signals provided by the soot loading expectation assembly.

In one embodiment, the algorithm of regeneration determination function 94 may be configured to compare the sampled soot loading expectation assembly signals 92 with at least one reference value 98. From those inputs the regeneration determination function 94 may determine the number of soot loading expectation assembly signal samples above the at least one reference value 98 and the number of soot loading expectation assembly signal samples below the at least one reference value 98 and to output the difference between those numbers as the regeneration expectation value 96. The at least one reference value 98 may include a reference temperature, a reference NOX, a reference torque/speed-combination or the like. The reference value may also be embodied as a histogram of minimum acceptable soot loading expectation assembly signals that may have been calibrated during development of the engine assembly. A more sophisticated comparison may be feasible as well to determine a regeneration expectation value 96. For example, the more recent exhaust gas temperatures may have a larger weight in the comparison than the older exhaust gas temperatures. Also other signals that may influence the regeneration expectation may be combined with the exhaust gas temperature signal.

In an embodiment, the electronic controller 42 may include a decision function 100 including a decision rule. The decision function 100 may have as input signals the regeneration expectation value 96 and an actual soot loading level related parameter, for example, a soot loading trend parameter 102 or an actual soot loading level. The actual soot loading trend parameter 102 may be derived from a signal 54 or 60 from actual soot loading level sensor assembly. In an embodiment, the electronic controller 42 may be configured to derive an actual soot loading trend parameter 102 from the signal 54 of the actual soot loading level sensor assembly 52 by differentiating the actual soot loading level sensor assembly signal 54 with respect to time. That may be done by a differentiating function 104. The differentiated signal 106 may be passed through a low pass filter 108. Thus quick fluctuations in the differentiated signal 106 may be eliminated and the soot loading trend parameter 102 may be obtained.

In an embodiment, the decision function 100 may provide an output signal. The output signal may be, for example, true 110 or false 112. The decision function 100 may in an embodiment include the following decision rule: "Does the regeneration expectation value indicate that regeneration has been promoted and is the soot loading trend parameter 102 positive?". When the answer is true 110, a discrepancy between the regeneration expectation value 96 and the actual soot loading trend parameter 102 may be present. Such a discrepancy may indicate that the after-treatment system 33 has been contaminated. Various actions 114 may be taken on the basis of this output signal 110. When the answer is false 112, then the conclusion may be that the after-treatment system 33 is functioning correctly and that no actions 116 have to be taken.

In an embodiment, the electronic controller 42 may be configured to log a diagnostic code in the memory responsive to the at least one output signal. The diagnostic code may indicate that the after-treatment system may be contaminated. More particular, when the output signal of the decision function 100 is true 110, an output signal 80 may be generated for logging diagnostic code in a log file 82. The diagnostic code may be used for an on board diagnostics system (OBD).

It is contemplated that the internal combustion engine assembly may include at least one signaling device 78 for signaling a user of the internal combustion engine assembly that the after-treatment assembly may be contaminated. The signaling device 78 may in one embodiment be a warning light and/or a warning sound generating device that may warn a user. The electronic controller 42 may be configured to activate the at least one signaling device 78 responsive to the at least one output signal. More particularly, the signaling device 78 may be activated by an output signal 76 of the controller 42 when the decision function 100 outputs a true signal 110.

In an embodiment the electronic controller may be configured to alter operating conditions of the internal combustion engine assembly responsive to the at least one output signal. The output signal may, for example, be the output signal of the decision function 100. The alteration of the operating conditions may include de-rating the engine assembly and/or stopping the engine assembly.

The electronic controller 42 may be configured to determine on the basis of the actual soot loading level sensor assembly signal 54, 60 whether the actual soot loading level related parameter indicates that the actual soot loading level in the particulate filter decreases. The controller 42 may configured to do this at the end of the de-contamination procedure. To that end, the duration of the certain time of the de-contamination procedure may be increased beyond 20 minutes, for example to the range of 20-50 minutes. The electronic controller 42 may also be configured to log a diagnostic code in the memory, to active a signaling device and/or to stop the engine responsive to the determination that the actual soot loading level in the particulate filter 38 does not decrease after the de-contamination procedure.

The various embodiments described above may be combined with each other or may be applied separate from each other.

INDUSTRIAL APPLICABILITY

The internal combustion engine assembly may be applied in any application in which a mechanical force is needed, for example, for driving a machine. The machine may be of any type including, for example, a work machine, a vehicle, a pump, an electric generator and a screw of a ship.

Contamination of an after-treatment system 33 of an internal combustion engine assembly may for example occur when the user may have used the wrong fuel. For example, in diesel engine assemblies, using diesel fuel that contains sulfur may inadvertently de-activate or inhibit operation of the after-treatment assembly 33. Normally, a user will not be warned that the after-treatment system 33 may have been contaminated.

In one embodiment a de-contamination procedure may be present. During the de-contamination procedure the contamination containing fuel from the fuel supply system 72 may be replaced by a fuel that fulfills the requirements. Also other components that may have been in contact with the contaminated fuel may be replaced. Such components may be fuel filters. The fuel system may be flushed, for example, with non-contaminated fuel. The particulate filter 38 and the oxidation catalyst 36 may be de-contaminated by increasing the exhaust gas temperature at an inlet of the after-treatment system 33 to above a de-contamination temperature during a certain time period. The de-contamination may be started by the user by operating the decontamination button 84. For a diesel engine after-treatment system 33 having a diesel particulate filter 38 and a diesel oxidation catalyst 36 the de-contamination temperature may be approximately 400° C. The certain time period of the increased exhaust gas temperature may be more than approximately 6 minutes. Generally, the de-contamination time period may end at approximately 20 minutes to obtain a complete de-contamination.

As explained in the detailed description, the increased exhaust gas temperature for the de-contamination procedure may be obtained by controlling the position of back pressure valve 34. By closing the backpressure valve 34, the exhaust gas temperature may be increased in a very effective manner. The position of the backpressure valve 34 may not only be used to increase the exhaust gas temperature to above the de-contamination temperature but may also be used to prevent that the exhaust gas temperature exceeds the de-contamination temperature too much. Thus, with a minimum of extra fuel use, the decontamination procedure may be effected.

Other parameter that may be used in embodiments for increasing the exhaust gas temperature to above the de-contamination temperature may include: the load of the engine 10, the speed of the engine 10, the position of the intake throttle valve 19, the intake pressure and the fuel supply to the at least one combustion chamber 70 including, for example, the amount of fuel supplied to the at least one combustion chamber 70 and/or the fuel injection timing.

The load of the engine 10 may be increased by using auxiliary equipment 68. Auxiliary equipment 68 that may be controlled by the controller 42 for increasing the load may be one or more equipment chosen from a group including: a water pump, an air conditioner, a hydraulic pump, an electric generator, a fan, a heating system, a compressor, and lights. Of course, other auxiliary equipment may be used also for increasing the load of the engine 10 in order to obtain de-contamination of the after-treatment system 33.

The intake pressure may be increased by closing the waste gate valve that may by-pass exhaust gas along the turbine 22. Intake throttle valve 19 and the fuel supply system 72 may also be controlled for changing the air/fuel-ratio and thus increase the exhaust gas temperature to and above the de-contamination temperature. In one embodiment, fuel injectors 74 for injecting fuel in an associated one of the at least one combustion chamber 70 may be controlled so that the amount of fuel and the fuel injection timing of the at least one fuel injector 74 raises the temperature of exhaust gas above a de-contamination limit temperature. An air/fuel mixture that contains relatively much fuel, i.e. a rich air/fuel mixture, may increase exhaust gas temperature. The exhaust gas temperature may also be increased by post injection, which involves injecting additional fuel into the combustion chambers after the combustion has taken place, which may result in the additional fuel being burned in the exhaust system, thereby elevating the temperature of the exhaust gases in the system.

It is contemplated that de-contamination may also be effected by active measures. For example, de-contamination may be effected by heating the housing of the after-treatment system 33 or by injecting fuel in the exhaust system that may burn in the exhaust system and that may heat the exhaust gas.

In an embodiment the electronic controller 42 may determine that de-contamination should be effected. To that end, a signal may be outputted to a user indicative that the exhaust gas temperature at an inlet of the after-treatment system should be increased to above a de-contamination temperature during a certain time period. That may prompt the user to start the de-contamination procedure as described above.

For this purpose, method may be provided for detecting after-treatment system contamination in an internal combustion engine assembly. To that end, an expected soot loading level related parameter in the particulate filter 38 may be determined on the basis of a soot loading level expectation assembly signal history. In an embodiment that may be on the basis of an exhaust gas temperature history. This may, for example be done by storing combinations 92 of sample times and soot loading level expectation assembly signals, that may, in an embodiment be exhaust gas temperatures. These combinations 92 may be compared with at least one reference value. When, in an embodiment, the actual temperature history indicates temperatures that are higher than the at least one reference temperature, for example a histogram of minimum acceptable exhaust gas temperatures adjacent the inlet of the after-treatment system 33, it may be concluded that regeneration of the particulate filter 38 may have been promoted. This conclusion may be represented by a regeneration expectation value 96 that may represent the expected soot loading level related parameter. As explained before, the regeneration expectation value 96 may be simple, e.g 1 or 0, indicating respectively regeneration promoted and regeneration not promoted. The regeneration expectation value 96 may also be more complex and represent the amount of the expected regeneration or the amount of expected soot formation in the particulate filter 38.

The method may also determine on the basis of the actual soot loading level sensor assembly signal 54 or 60 an actual soot loading level related parameter in the particulate filter. In an embodiment the actual soot loading level related parameter may be the soot loading trend parameter 102 that may be obtained by differentiating the actual soot loading level sensor assembly signal 54 or 60 with respect to the time and by passing the differentiated signal 106 through the low pass filter 108. The actual soot loading trend parameter 102 may indicate increase of the actual soot loading level or decrease of the actual soot loading level.

The method may compare the expected soot loading level related parameter, for example the regeneration expectation value 96, with the actual soot loading level related parameter, for example the actual soot loading trend parameter 102, and may, responsive to the comparing, provide at least one output signal.

In an embodiment the output signal 76 may activate a signaling device 78 signaling the user that the after-treatment assembly 33 may be contaminated. It is also contemplated that the output signal 80 may log a diagnostic code in a log file 82 of the on board diagnostic system of the internal combustion engine system. In an embodiment, the output signal may de-rate or stop the internal combustion engine.

At the end of the de-contamination procedure, it may be determined with the actual soot loading level sensor assembly whether actual soot loading level in the particulate filter 38 decreases. That is, determine whether the particulate filter 38 is regenerated again. To that end, the certain time period may be longer than 20 minutes. If no regeneration is determined by the actual soot loading level sensor assembly 54 or 60, the electronic controller 42 may log a diagnostic code in the log file 82 of the on board diagnostic system. In an embodiment, the on board diagnostic system may then indicate to replace the after-treatment assembly 33 partly or completely. It is also contemplated that the signaling device 78 is activated to indicate that the de-contamination procedure did not have the desired effect. In an embodiment the engine 10 may be stopped responsive to the determination that the actual soot loading level in the particulate filter 38 does not decrease after the de-contamination procedure. This may be caused by other factors. For example, the contamination may not have been sulfur but another substance that may not be removed by increasing the temperature up to 400° C. for a certain time.

It will be apparent to those having ordinary skill in the art that various modifications and variations can be made to after-treatment system de-contamination as disclosed herein. Other embodiments will be apparent to those having ordinary skill in the art from consideration of the specification. It is intended that the specification and examples are considered as exemplary only. Other aspects, features and advantages will be apparent upon an examination of the attached drawings and appended claims.

What is claimed is:

1. An internal combustion engine assembly comprising:
   at least one combustion chamber;
   an exhaust system with an after-treatment system having an oxidation catalyst and a particulate filter;
   an electronic controller configured to detect a contamination condition of the oxidation catalyst and the particulate filter, the contamination condition being different from a high soot loading in the particulate filter; and
   the electronic controller having a de-contamination function that is, responsive to a command, configured to de-contaminate the particulate filter and the oxidation catalyst by increasing the exhaust gas temperature at an inlet of the after-treatment system to above a de-contamination temperature during a certain time period,
   wherein the electronic controller is configured to detect the contamination condition based on a detected discrepancy between an expected regeneration value and an actual soot loading level related parameter in the oxidation catalyst and the particulate filter.

2. The internal combustion engine assembly according to claim 1 including:
   a fuel supply system for introducing fuel into the at least one combustion chamber;
   a back pressure valve in the exhaust system;
   the de-contamination function of controller being configured to control a position of the back pressure valve for increasing the exhaust gas temperature at the inlet of the after-treatment system to above the de-contamination temperature.

3. The internal combustion engine according to claim 1, wherein the controller is configured to control at least one of the following parameters for increasing the exhaust gas temperature at the inlet of the after-treatment system to above the de-contamination temperature:
   a load of the engine;
   a speed of the engine;
   a position of an intake throttle valve;
   an intake pressure;
   a fuel supply to the combustion chamber including at least one of a fuel amount and a fuel injection timing;
   a waste gate valve position; and
   an EGR-valve position.

4. The internal combustion engine assembly according to claim 1, wherein the controller is configured to increase the exhaust gas temperature to above 400° C.

5. The internal combustion engine assembly according to claim 1, wherein the certain time is longer than about 6 minutes.

6. The internal combustion engine assembly according to claim 1, wherein the certain time is shorter than about 20 minutes.

7. The internal combustion engine assembly according to claim 1, wherein the electronic controller is configured to detect the contamination condition caused by wrong fuel used in the combustion engine.

8. The internal combustion engine assembly according to claim 1, wherein, upon detection of the contamination condition, the electronic controller is configured to signal a user of the contamination condition and request the command from the user.

9. The internal combustion engine assembly according to claim 1, wherein the controller is configured to provide an output signal indicative that the command for activating the de-contamination function should be given.

10. The internal combustion engine according to claim 9, wherein:
    the expected regeneration value is determined by a soot loading expectation assembly configured to provide a signal that includes information related to an expected soot loading level related parameter;
    the actual soot loading level related parameter is determined by an actual soot loading level sensor assembly of the exhaust system;
    the electronic controller is configured to:
       determine on the basis of a soot loading expectation assembly signal a history value or signal indicative of an expected soot loading level related parameter in the particulate filter,
       determine on the basis of the actual soot loading level sensor assembly signal a value or signal indicative of an actual soot loading level related parameter in the particulate filter, and
       compare the expected soot loading level related parameter history value or signal with the actual soot loading level related parameter value or signal and responsive to the comparing provide at least the output signal.

11. The internal combustion engine assembly of claim 10, wherein the soot loading expectation assembly includes an exhaust gas temperature sensor, wherein the soot loading expectation assembly signal history value or signal is an exhaust gas temperature history.

12. The internal combustion engine assembly according to claim 10, wherein the soot loading expectation assembly includes at least one sensor chosen from the group including:
    a torque sensor;
    an engine speed sensor;
    an intake throttle valve position sensor;
    an EGR-valve position sensor;
    a backpressure valve position sensor; and
    a chemical composition sensor in the exhaust system that is configured for measuring at least one of the presence and the concentration of at least one chemical component in the exhaust gas.

13. The internal combustion engine assembly of claim 10, wherein the actual soot loading level sensor assembly includes a soot loading sensor that is connected to the electronic controller and that is arranged for directly determining the actual soot loading level related parameter.

14. The internal combustion engine assembly of claim 13, wherein the soot loading sensor is a RF-sensor in the after-treatment system.

15. The internal combustion engine assembly of claim 10, wherein the electronic controller includes a soot loading expectation assembly signal history function configured to store in the memory combinations of sample time moments and associated soot loading expectation assembly signals to determine the soot loading expectation assembly signal history value, the soot loading expectation assembly signal history function having input parameters including at least a soot loading expectation assembly signal provided by the soot loading expectation assembly, and a sample time signal.

16. The internal combustion engine assembly according to claim 15, wherein the electronic controller includes a regeneration determination function having as input parameters the combinations of sample time moments and associated soot loading expectation assembly signals over a certain time period and including an algorithm configured to determine whether regeneration has been promoted and to output a regeneration expectation value.

17. The internal combustion engine assembly according to claim 16, wherein the electronic controller includes a decision function including a decision rule and having as input signals the regeneration expectation value and an actual soot loading trend parameter derived from the actual soot loading level sensor assembly signal and providing one of the at least one output signals, the one of the at least one output signals being true or false and the decision rule being:
whether the regeneration expectation value indicates that regeneration has been promoted and the soot loading trend parameter is positive.

18. The internal combustion engine assembly according to claim 10, wherein the electronic controller is configured to derive an actual soot loading trend parameter from the signal of the actual soot loading level sensor assembly by differentiating the actual soot loading level sensor assembly signal with respect to time and by passing the result through a low pass filter.

19. An internal combustion engine assembly comprising:
at least one combustion chamber;
an exhaust system with an after-treatment system having an oxidation catalyst and a particulate filter;
an electronic controller having a de-contamination function that is, responsive to a command, configured to de-contaminate the particulate filter and the oxidation catalyst by increasing the exhaust gas temperature at an inlet of the after-treatment system to above a de-contamination temperature during a certain time period;
a soot loading expectation assembly configured to provide a signal that includes information related to an expected soot loading level related parameter;
the exhaust system including an actual soot loading level sensor assembly configured to provide a signal that includes information related to an actual soot loading level related parameter;
wherein the electronic controller is configured to:
  determine on the basis of a soot loading expectation assembly signal history value or signal indicative of an expected soot loading level related parameter in the particulate filter,
  determine on the basis of the actual soot loading level sensor assembly signal a value or signal indicative of an actual soot loading level related parameter in the particulate filter, and
  compare the expected soot loading level related parameter value or signal with the actual soot loading level related parameter value or signal and responsive to the comparing provide at least the output signal,
wherein the controller is configured to provide an output signal indicative that the command for activating the de-contamination function should be given,
wherein the electronic controller includes a soot loading expectation assembly signal history function configured to store in the memory combinations of sample time moments and associated soot loading expectation assembly signals to determine the soot loading expectation assembly signal history, the soot loading expectation assembly signal history function having input parameters including at least a soot loading expectation assembly signal provided by the soot loading expectation assembly, and a sample time signal,
wherein the electronic controller includes a regeneration determination function having as input parameters the combinations of sample time moments and associated soot loading expectation assembly signals over a certain time period and including an algorithm configured to determine whether regeneration has been promoted and to output a regeneration expectation value, and
wherein the algorithm of the regeneration determination function is configured to compare the sampled soot loading expectation assembly signals with at least one reference value and to determine the number of soot loading expectation assembly signal samples above the at least one reference value and the number of soot loading expectation assembly signal samples below the reference value and to output the difference between those numbers as the regeneration expectation value.

20. A method for de-contaminating an after-treatment assembly of an exhaust system of an internal combustion engine assembly having at least one combustion chamber, the after-treatment assembly having a particulate filter and an oxidation catalyst, the method including:
detecting a contamination condition of the particulate filter and the oxidation catalyst, the contamination condition being different from a high soot loading in the particulate filter; and
upon detection of the contamination condition, increasing the exhaust gas temperature at an inlet of the after-treatment system to above a de-contamination temperature during a certain time period,
wherein detecting the contamination condition includes detecting the contamination condition based on a detected discrepancy between an expected regeneration value and an actual soot loading level related parameter in the oxidation catalyst and the particulate filter.

21. The method according to claim 20, wherein, for an internal combustion engine assembly having an air intake system, a fuel supply system for introducing fuel into the at least one combustion chamber, a back pressure valve in the exhaust system, the method including:
controlling a position of the back pressure valve for increasing the exhaust gas temperature at the inlet of the after-treatment system to above the de-contamination temperature.

22. The method according to claim 20, including:
controlling at least one of the following parameters for increasing the exhaust gas temperature at the inlet of the after-treatment system to above the decontamination temperature:
a load of the engine;
a speed of the engine;
a position of an intake throttle valve;
an intake pressure;
a fuel supply to the combustion chamber including at least one of a fuel amount and a fuel injection timing;

a waste gate valve position; and
an EGR-valve position.

23. The method according to claim 20, wherein the exhaust gas temperature is increased to above 400° C.

24. The method according to claim 20, wherein the certain time is longer than about 6 minutes.

25. The method according to claim 20, wherein the certain time is shorter than about 20 minutes.

26. The method according to claim 20, including:
determining that de-contamination should be effected; and
outputting a signal to a user indicative that the exhaust gas temperature at an inlet of the after-treatment system should be increased to above a de-contamination temperature during a certain time period.

27. The method according to claim 20, wherein the internal combustion engine assembly has an actual soot loading level sensor assembly, and the method includes:
determining on the basis of a signal of the actual soot loading level sensor assembly signal whether the actual soot loading level in the particulate filter decreases.

28. The method according to claim 20, wherein detecting the contamination condition includes detecting the contamination condition caused by wrong fuel used in the combustion engine.

29. The method according to claim 20, further including, upon detection of the contamination condition, signaling a user of the contamination condition and requesting a command from the user for activating the step of increasing the exhaust gas temperature.

* * * * *